United States Patent [19]

Chung et al.

[11] 4,227,281
[45] Oct. 14, 1980

[54] CASTER PAD

[75] Inventors: Tai H. Chung, Rancho Palos Verdes; Damong Lee, Los Angeles, both of Calif.

[73] Assignee: P. J. Company, Carson, Calif.

[21] Appl. No.: 7,415

[22] Filed: Jan. 29, 1979

Related U.S. Application Data

[63] Continuation-in-part of Ser. No. 916,742, Jun. 19, 1978, abandoned.

[51] Int. Cl.³ ............................................. B60B 33/00
[52] U.S. Cl. ........................................... 16/29; 16/30
[58] Field of Search ............... 16/29, 31 R, 31 A, 30, 16/43; 248/188, 188.8, 188.9, 177; 403/338, 335, 336; 190/18 A

[56] References Cited

U.S. PATENT DOCUMENTS

| | | | |
|---|---|---|---|
| 55,567 | 6/1866 | Wilkins | 16/30 |
| 2,125,292 | 8/1938 | Herold | 16/31 R |
| 2,790,196 | 4/1957 | Rideout et al. | 16/31 R |
| 2,800,679 | 7/1957 | Schultz | 16/29 |
| 3,667,085 | 6/1972 | Cumella | 16/30 |
| 3,987,875 | 10/1976 | Szabo | 16/30 X |

*Primary Examiner*—George H. Krizmanich
*Attorney, Agent, or Firm*—Smyth, Pavitt, Siegemund, Jones & Martella

[57] ABSTRACT

A caster pad permanently attachable to the underside of a receptacle to permit a caster to be quickly mounted to the receptacle by insertion into the caster pad and to be quickly removed from the receptacle by releasing it from the caster pad. In one embodiment, the caster pad employs no specialized parts but instead is formed from a single piece of sheet metal to which standard bolts are affixed for locking the caster into the caster pad. In addition to the bolts, the caster pad consists of a unitary piece of metal whose edges are bent out of the plane of its flat central portion to form flanges which help to retain the caster and which include threaded holes for attaching the bolts.

In another embodiment, the plate of the caster is inserted laterally into the caster pad and is retained in position by a spring which, after being compressed for installation, expands to an installed position under the caster pad's retaining lips which previously loosely embraced the edges of the inserted caster plate, to jam the caster plate flush against the caster pad and to retain it in that position.

5 Claims, 5 Drawing Figures

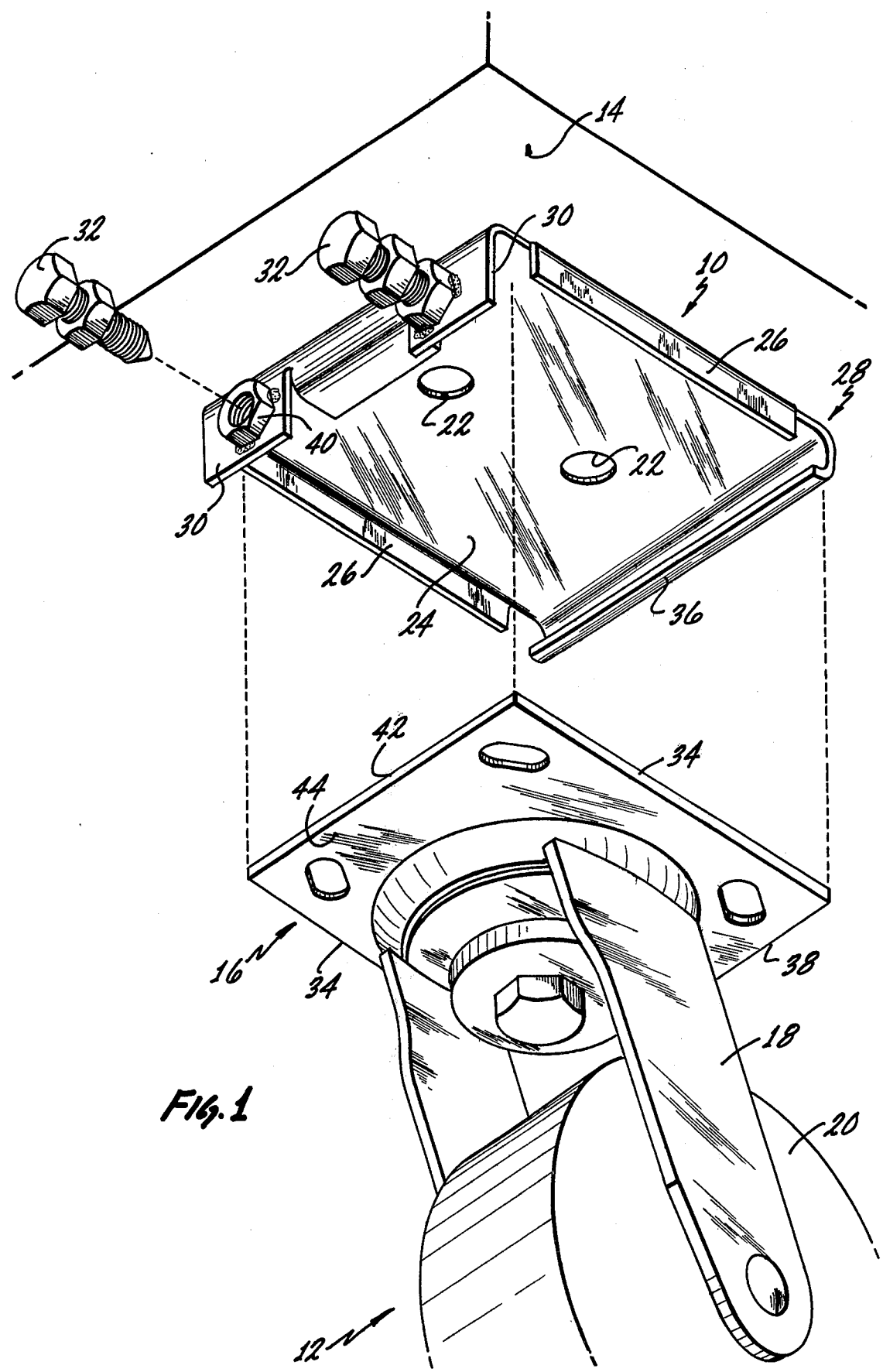

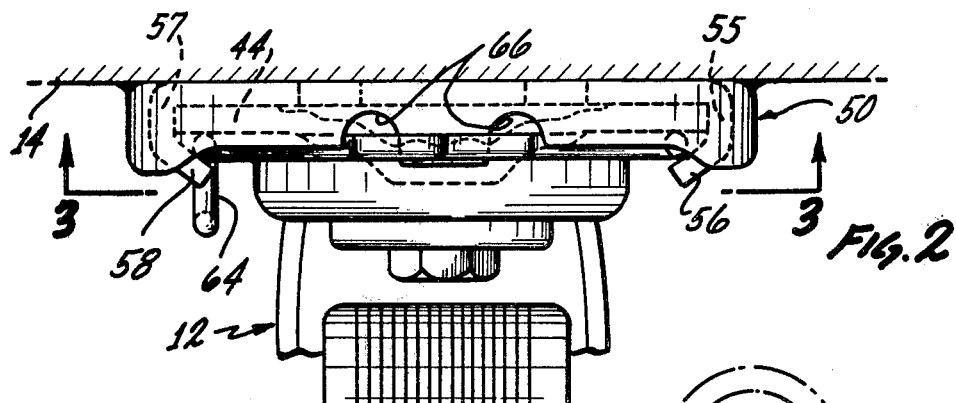
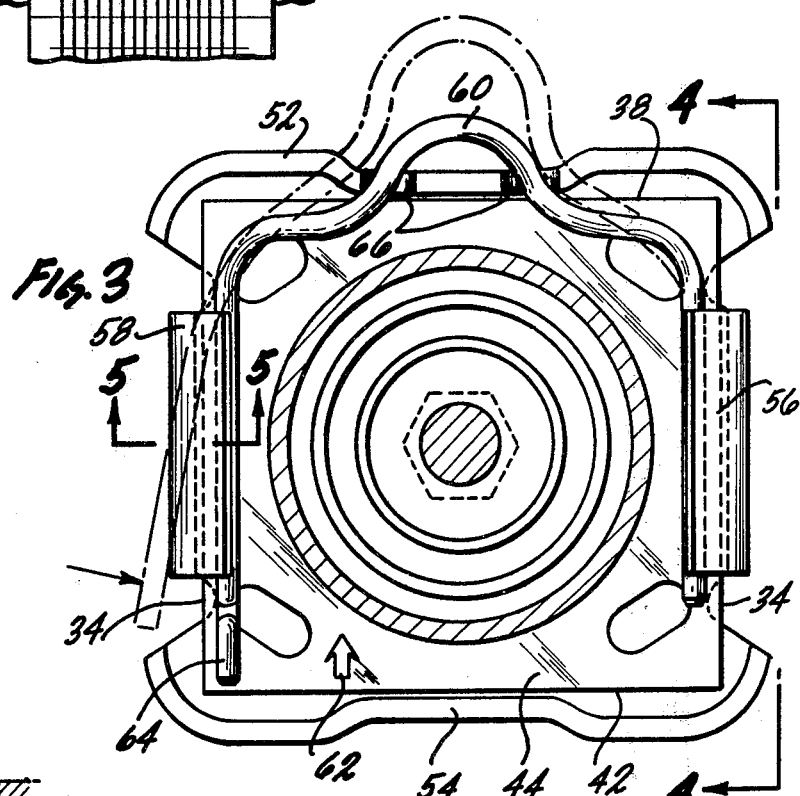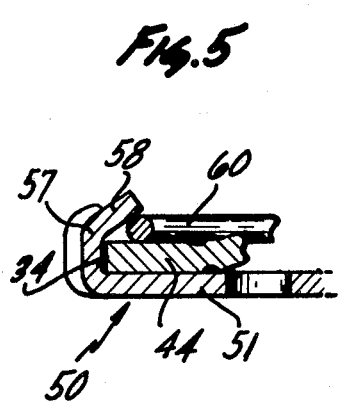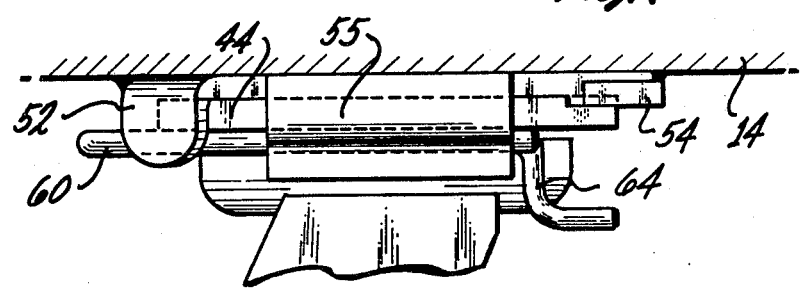

CASTER PAD

BACKGROUND OF THE INVENTION

The present application is a continuation-in-part of the U.S. patent application Ser. No. 916,742 filed June 19, 1978, now abandoned, by Tai Ho Chung and Damong Lee for CASTER PAD. Both the earlier application ane the present application are assigned tothe P. J. Company of Carson, Calif.

The present invention deals with devices which normally are permanently mounted to the underside of a large container or receptacle, such as those used for holding trash and the like, to permit a caster to be removably affixed to the receptacle.

A caster pad is described in U.S. Pat. No. 3,667,085 issued June 6, 1972 to Cumella et al. The caster pad of Cumella et al. differs from that of the present invention in the means by which the caster is retained in the caster pad. In the device of Cumella et al., a specially shaped bolt or locking pin is used which extends all the way across the width of the caster pad. This special bolt or locking pin is not a standard commercial part and must be fabricated specially for use in the device. In addition, if the bolt or locking pin should become detached or misplaced, it could not be replaced by a standard bolt.

In a first embodiment of the present invention, in contrast to some caster pads of the prior art, it is not necessary with the present invention to remove the retaining bolts completely from the caster pad. Instead the caster can be removed while the retaining bolts are still retained by the pad provided the bolts are backed off sufficiently from their normal position. This feature of the present invention makes it easier to remove the caster and prevents loss of the bolts.

SUMMARY OF THE INVENTION

These limitations of the prior art device are overcome in a first embodiment of the present invention by the use of a standard bolt to lock the caster in place in the caster pad. In that embodiment, the standard bolt extends, not across the width of the caster pad, but instead extends inwardly from one end of the caster pad to retain the caster within the pad.

The first embodiment of the invention employs no specialized parts, but instead is formed from a single piece of sheet metal to which standard bolts are affixed for locking the caster into the caster pad.

In a second embodiment of the present invention, a special spring is used to lock the caster into the caster pad.

These and other objects and advantages of the invention will be better understood from the following description considered in connection with the accompanying drawing in which the present invention is illustrated by way of example. It is to be expressly understood, however, that the drawing is for the purpose of illustration and description only and is not intended as a definition of the limits of the invention.

BRIEF DESCRIPTION OF THE DRAWINGS

FIG. 1 shows a perspective view of a first embodiment of the caster pad of the present invention;

FIG. 2 is an elevation view of a second embodiment of the caster pad;

FIG. 3 is a cross sectional bottom view of the second embodiment in the direction 3—3 indicated in FIG. 2;

FIG. 4 is a fractional side view of the second embodiment in the direction 4—4 indicated in FIG. 3; and, FIG. 5 is a fractional elevation view in cross section in the direction 5—5 indicated in FIG. 3.

DESCRIPTION OF THE PREFERRED EMBODIMENTS

The caster pad 10, according to the first preferred embodiment of the present invention, is used to permit a caster 12 to be quickly mounted to a receptacle 14 by inserting the caster 12 into the caster pad 10 which is permanently attached to the underside of the receptacle, and for permitting the caster 12 to be quickly removed from the caster pad by releasing it therefrom.

The caster 12 includes a caster plate 16 which is generally rectangular in shape and further includes a yoke 18, typically mounted to the caster plate 16, the wheel 20 being rotatably mounted in the yoke.

The caster pad 10 includes holes 22 to facilitate its being mounted to the receptacle 14. In the first preferred embodiment of the invention, the caster pad 10 is permanently affixed to the underside of the receptacle 14 by fasteners such as bolts or rivets, although in other embodiments, the caster pad is welded to the receptacle.

According to the first preferred embodiment of the present invention, the caster pad 10 includes a unitary structure formed of heavy sheet metal and having a base 24, a pair of lateral flanges 26, a first end flange 28 and a second end flange 30. The caster pad 10 further includes fasteners 32 for retaining the caster plate 16 within the structure formed by the caster pad.

In the first preferred embodiment, the lateral flanges 26 extend perpendicularly from the base 24 along the side edges thereof. The lateral flanges 26 are parallel to each other and are spaced apart a distance slightly greater than the width of the caster plate 16, so that when the caster plate is inserted between the lateral flanges 36, the lateral flanges 26 lie adjacent the side edges 34 of the caster plate 16.

The first end flange 28 also extends perpendicularly to the base 24 and includes a lip extending parallel to the base and toward the central portion of the base 24. The lip 36 is used for retaining an end 38 of the caster plate 16 when the end 38 has been inserted into the caster pad under the lip 36.

The caster pad 10 further includes a second end flange 30 having an aperture 40 extending through it in a direction toward the first end flange 28. In the first preferred embodiment, the aperture 40 is threaded to retain a threaded fastener 32 such as a bolt which is inserted through the aperture 40 so that the fastener 32 extends inwardly from the second end flange 30 toward the central portion of the base, thereby serving to retain the edge 42 of the caster plate 16 when the caster plate 16 has been inserted into the caster pad 10.

It is recognized that other types of fasteners 32 may be used, such as snap-fasteners having a detenting action. In accordance with the present invention, the fasteners 32 extend toward the first end flange 28 which includes the lip 36.

In operation, the caster pad is permanently affixed to the receptacle 14, usually at a corner of its underside. If the receptacle 14 is to remain stationary for a long time, it is not necessary that the casters 12 be inserted into the caster pads 10. The receptacle 14 generally rests on the caster pads 10, which space the bottom of the receptacle from the floor or the ground, thereby permitting the receptacle 14 to be picked up with a fork lift. When it is desired to move the receptacle 14, it is raised a small distance from the ground sufficient to permit the caster 12 to be inserted into the caster pad 10. Insertion is accomplished by aligning the sides 34 of the caster plate 16 with the lateral flanges 26 of the caster pad 10 and inserting the edge 38 of the caster plate 16 under the lip 36 of the first end flange 28. Next, the edge 42 of the caster plate 16 is moved toward the base 24 of the caster pad 10 until the surface 44 of the caster plate 16 lies between the apertures 40 and and the base 24. Thereafter, the fasteners 32 are inserted through the apertures 40, and they retain the edge 42 of the caster plate within the caster pad 10.

Removal of the caster 12 may be required to replace it when it has been damaged or when it is no longer needed. Removal is accomplished, according to the present invention, by removing the fasteners 32 from the apertures 40, thereby releasing the edge 42 of the caster plate 16 so that it may be drawn away from the base 24 and then withdrawn from beneath the lip 36.

FIGS. 2-5 relate to a second preferred embodiment of the present invention in which a spring is used to retain the plate 44 of the caster 12 in position in the caster pad 50. The caster pad is attached to the base of the receptacle 14 by welding or by bolts as appropriate, and the caster pad has a generally rectangular shape. In this second embodiment, the caster pad 50 includes a base 51, a downwardly directed lateral flange 52 along a first side and a similar downwardly directed lateral flange 54 on the opposite side; it should be noted that the flange 54 does not extend downward as far as the flange 52 extends downward. The caster pad 50 further includes a pair of downwardly-extending end flanges 55, 57 terminating in the retaining lips 56, 58, but leave in the which are used for retaining the caster plate 44 in the caster pad. The caster is held to the caster pad by the spring 60 as will described below.

In operation, the plate 44 of the caster 12 is inserted laterally into the caster pad in the direction indicated by the arrow 62 in FIG. 3. The plate being inclined slightly so as to clear the flange 54, but with the edges 34 of the plate 44 under the retaining lips 56, 58. The plate 44 is moved in the direction of the arrow 62 until the edge 38 abuts the flange 52, at which point the edge 42 of the plate 44 will lie within the flange 54, permitting the plate 44 to be held flush against the central portion of the caster pad. When the plate 44 is flush against the central portion of the caster pad, the edge 42 will be prevented from being withdrawn in a direction opposite the direction of the arrow 62 by the flange 54, as will be apparent from FIG. 4.

The spring as supplied in its uncompressed state has a shape indicated by the dot-and-dash lines of FIG. 3. One leg of the spring is inserted between the plate 34 and the lip of the retaining flange 56. Next, the other leg of the spring 60 is drawn toward the first leg and slipped under the edge of the retaining lip 58 so that the spring, when installed, occupies the position shown by the solid lines in FIG. 3. The end of arrow 64 for one of the legs of the spring 60 is bent downwardly to provide a convenient means of holding it.

From the drawings it is seen that the spring 60 interacts with the retaining lips 56, 58 to jam the plate 44 against the central portion of the caster pad and to retain the plate 44 in that position. When thus retained, the plate 44 is prevented from moving in the direction of the arrow 62 by the flange 52, while prevented from moving in a direction opposite the arrow 62 by the flange 54, and is prevented from moving laterally by the retaining lips 56, 58, which also prevent the caster from being removed.

The flange 52 further includes cut-out portions 66 through which a curved portion of the spring 60 winds in and out. These cut-out portions 66, and the portion of the flange between them, about which the spring 60 passes serve to prevent the spring 60 from being moved in the direction 62 and in the opposite direction.

The above detailed description is illustrative of several embodiments of the invention, but it will be understood that additional embodiments will be obvious to those skilled in the art. The embodiments described herein, together with those additional embodiments, are considered to be within the scope of the invention.

What is claimed is:

1. A caster pad permanently attachable to the underside of a receptacle permitting a caster to be quickly mounted thereto by insertion into the caster pad and to be quickly removed therefrom by release from the caster pad, said caster including a rectangular caster plate from which a wheel is typically mounted in a yoke, said caster pad comprising in combination;

a base adapted to be attached to the receptacle;

a pair of lateral flanges extending downward from said base and spaced to lie adjacent a first pair of opposite sides of the caster plate when said caster plate is mounted in said caster pad;

a pair of end flanges extending downward from said base and spaced to be adjacent a second pair of opposite sides of the caster plate when said caster plate is mounted in said caster pad, and terminating in lips directed inwardly from the second pair of opposite sides to loosely embrace the second pair of opposite sides so that some space remains between the lips and said caster plate;

one of said pair of lateral flanges extending downward far enough to prevent said caster plate from sliding laterally out of said caster pad when said caster plate is mounted flush against said base, but not so far as to interfere with insertion of said caster plate under said lips to its mounted position in said caster pad;

spring means including legs urged outwardly from the central portion of said caster plate into said space between the lips and said caster plate to hold said caster plate flush against said base.

2. The caster pad of claim 1 wherein said spring means further comprise in combination a generally U-shaped spring having two legs which are urged into said space between the lips and said caster plate when said spring has been installed.

3. The caster pad of claim 2 wherein the end of one of said two legs is bent out of the plane of said generally U-shaped spring to facilitate installation of said generally U-shaped spring.

4. The caster pad of claim 1 further comprising retaining means to preventing inadvertent removal of said spring means from its installed position.

5. The caster pad of claim 4 wherein paid retaining means is a pair of cut-out areas on the longer of said pair of lateral flanges.

* * * * *